US005694280A

United States Patent [19]

Zhou

[11] Patent Number: 5,694,280
[45] Date of Patent: *Dec. 2, 1997

[54] RESETTABLE LATCH MECHANISM

[75] Inventor: Liang Zhou, Guangdong, China

[73] Assignee: Pacific Sources, Inc., Greendale, Wis.

[*] Notice: The term of this patent shall not extend beyond the expiration date of Pat. No. 5,644,464.

[21] Appl. No.: 784,250

[22] Filed: Jan. 15, 1997

Related U.S. Application Data

[63] Continuation of Ser. No. 371,699, Jan. 12, 1995.

[51] Int. Cl.⁶ .................................................... H02H 3/16
[52] U.S. Cl. ............................ 361/45; 361/115; 335/18
[58] Field of Search ............................ 361/42, 45, 46, 361/49–50, 93, 99, 102, 115; 335/18, 2, 21, 166–167, 188

[56] References Cited

U.S. PATENT DOCUMENTS

| 3,252,052 | 5/1966 | Nash | 361/45 |
|---|---|---|---|
| 3,621,334 | 11/1971 | Burns et al. | 361/45 |
| 3,769,548 | 10/1973 | Pardue | 361/45 |
| 3,772,569 | 11/1973 | Wible | 361/45 |
| 3,800,189 | 3/1974 | Montz | 361/45 |
| 3,898,528 | 8/1975 | Runtsch et al. | 361/45 |
| 3,936,699 | 2/1976 | Adams | 361/45 |
| 4,010,432 | 3/1977 | Klein et al. | 335/18 |
| 4,079,344 | 3/1978 | Lauben et al. | 335/2 |
| 4,521,824 | 6/1985 | Morris et al. | 361/45 |
| 4,574,260 | 3/1986 | Franks | 335/18 |
| 4,578,732 | 3/1986 | Draper et al. | 361/45 |
| 5,202,662 | 4/1993 | Bienwald et al. | 335/18 |

*Primary Examiner*—Jeffrey A. Gaffin
*Assistant Examiner*—Michael J. Sherry
*Attorney, Agent, or Firm*—Welsh & Katz, Ltd.

[57] ABSTRACT

A portable ground fault interrupter is provided which includes a strong environmentally durable housing and plug inputs for plugging into an electrical outlet. The housing also contains receptacles to accept an electrical plug. A plurality of first electrical contacts are within the housing and stationary relative to the housing. A second plurality of electrical contacts corresponding to said first contacts are suspended within the housing by electrical conducting strips which biasingly move the second contacts away from the first contacts. A latching assembly selectively and operably engages said second contacts to overcome the force of the suspending strips to move the second contacts into electrical engagement with the first contacts. Occurrence of a ground fault removes the latching assembly from engagement with the second contacts breaking electrical contact between the first contacts and second contacts.

18 Claims, 3 Drawing Sheets

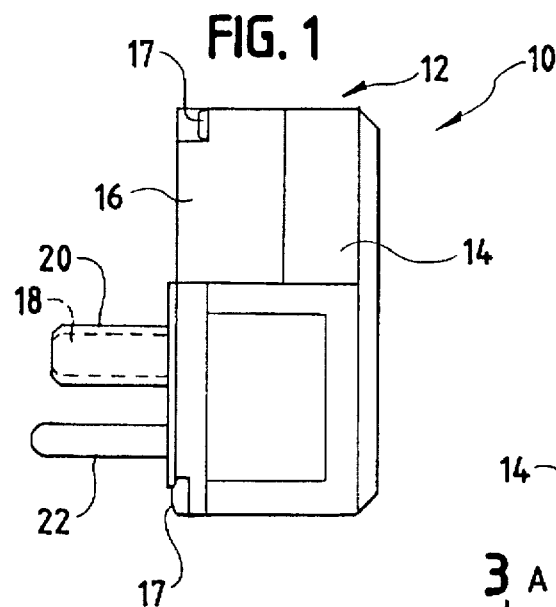
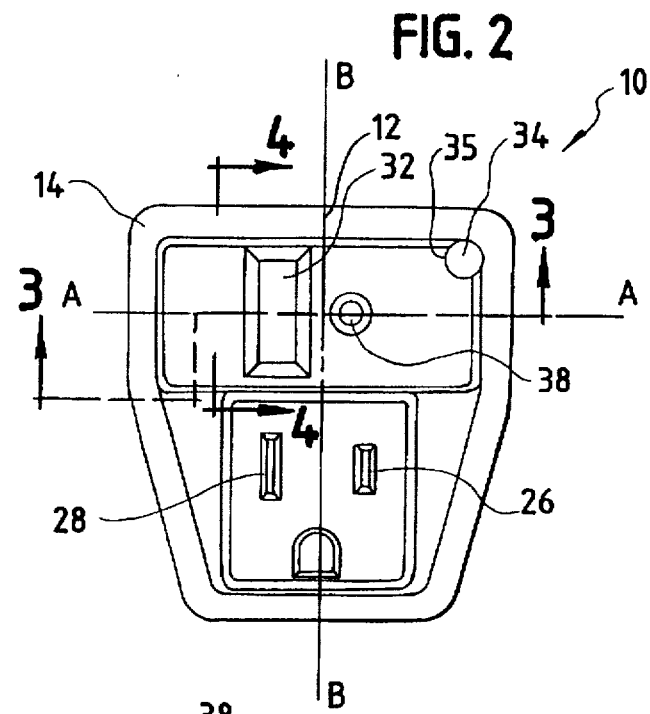
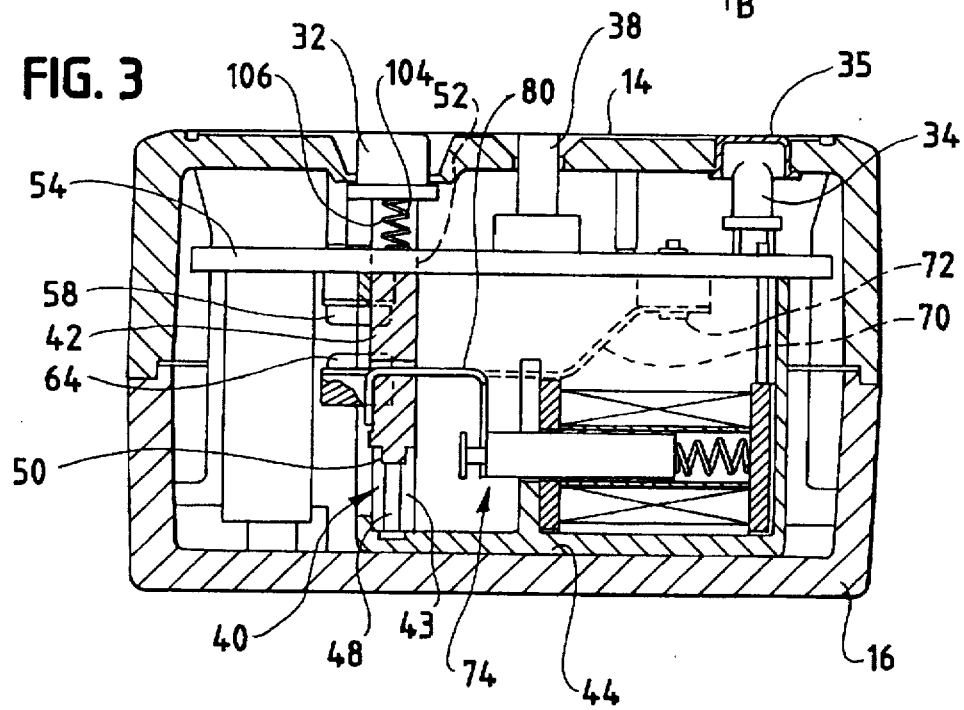

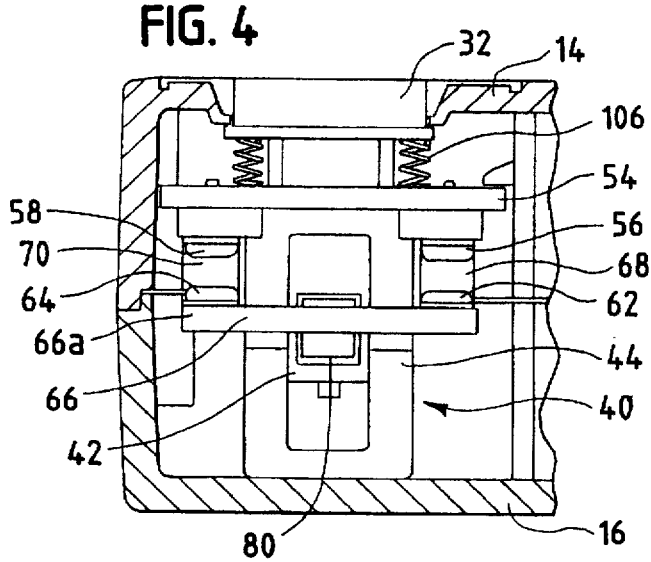
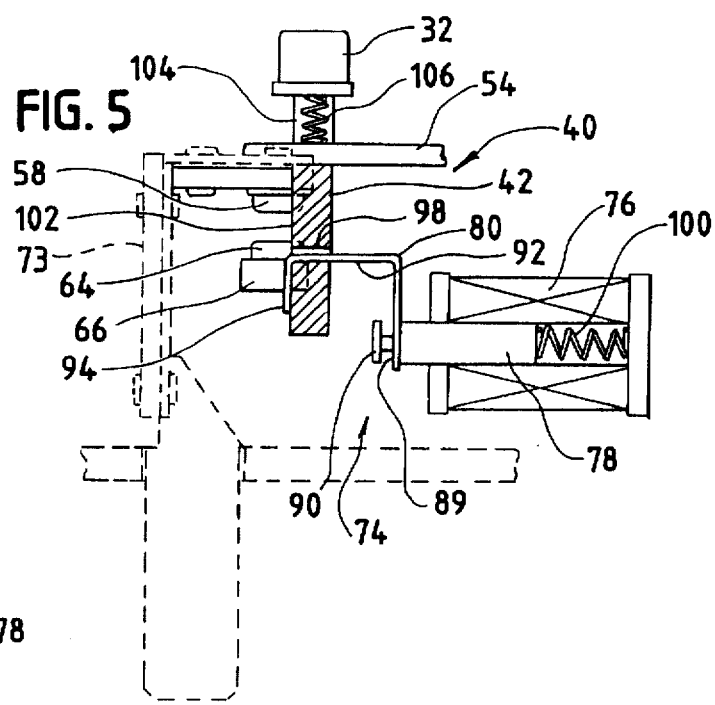
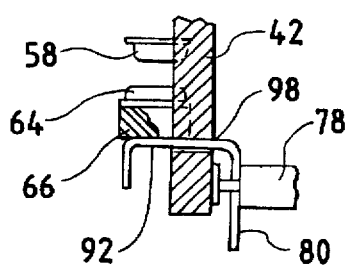
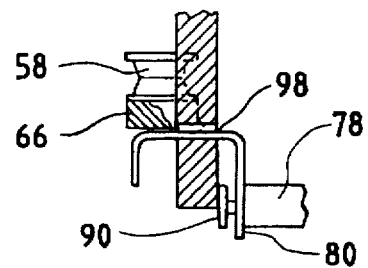

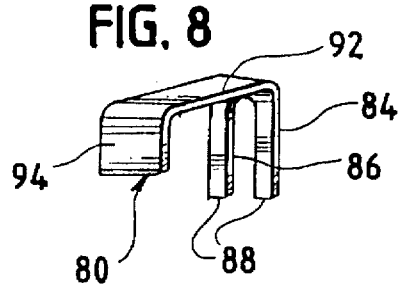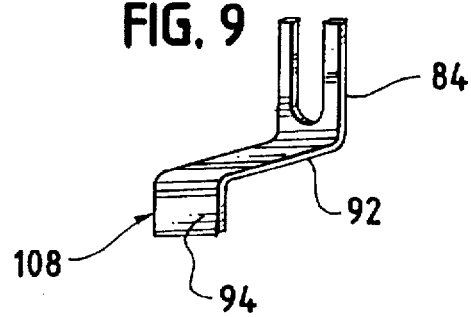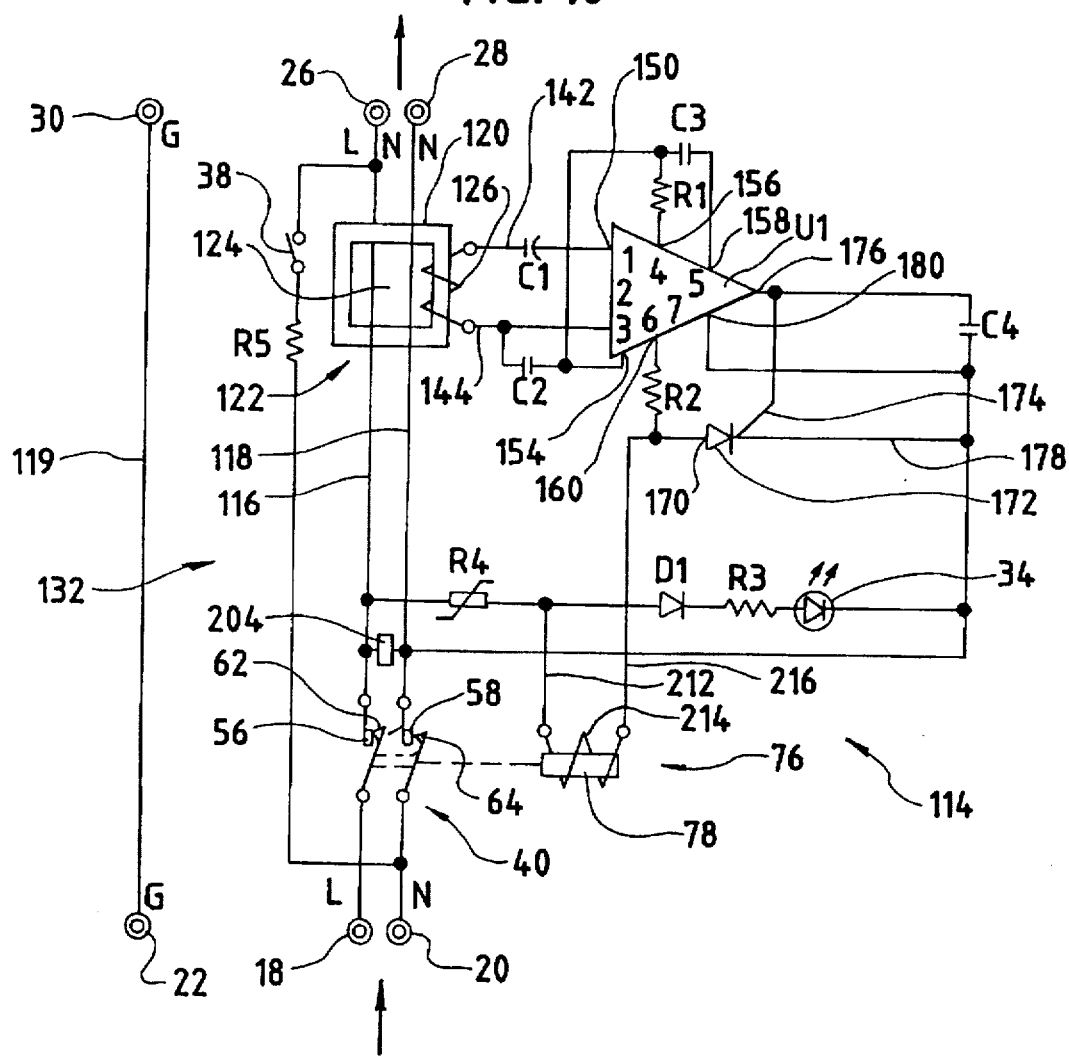

RESETTABLE LATCH MECHANISM

This application is a continuation of application Ser. No. 08/371,699 filed Jan. 12, 1995 which application is now pending.

FIELD OF THE INVENTION

The present invention relates to a resettable electric switch mechanism for the protection of equipment and people from ground faults and more specifically to a resettable latch mechanism of a ground fault circuit interrupter.

BACKGROUND OF THE INVENTION

The present invention relates to a resettable electric switch mechanism and more specifically to a resettable ground fault circuit interrupter.

Ground fault circuit interrupters (GFCI) are frequently used as devices to protect an individual or equipment from a ground fault. Because only a short exposure to electrical power may cause injury, it is desirable that GFCIs operate quickly in the event of a ground fault. It is also desirable that GFIs detect and respond to a breakage of the neutral conductor. Also, because the protection function of the GFCI is so important, a GFCI should provide an indication as to whether the GFCI is functioning properly.

Many of the presently installed electrical outlets or receptacles do not contain a ground fault circuit interrupter. The user may be subject to electrical shocks if an electrical short is developed in the appliance plugged into the receptacle. Additionally, a user may be electrocuted if he or she directly or indirectly contacts the "hot" conductor of an appliance plugged into the receptacle. Thus, it is desirable that a GFCI be adapted to be used in conjunction with the standard receptacle and provide ground fault interrupter protection.

It is also important that a portable GFCI be provided. This allows a user to provide ground fault circuit interrupter protection for any electrical receptacle which is to be used. Since frequent use of such a portable GFCI may be expected, it would be beneficial if the GFCI has a durable structure which operates with a low number of moving parts. The structure should be easily to assemble and manufacture to save production costs.

It is therefore an object of the present invention to provide an improved GFCI which very quickly determines when a ground fault occurs and promptly disconnects the power supplied to the line and neutral conductors. A related object is to provide such a GFCI which detects a breakage of the neutral conductor.

It is a further object of the present invention to provide an improved GFCI which visibly signals the functioning of the GFCI.

It is yet another object of the present invention to provide an improved GFCI which is portable and adapted to be used with standard electrical outlets.

It is a still further object of the present invention to provide an improved GFCI having a structure and assembly which reduces the number and complexity of the components of the GFCI to reduce production costs.

SUMMARY OF THE INVENTION

Accordingly, a portable ground fault circuit interrupter is provided. The ground fault circuit interrupter includes a strong environmentally durable housing and plug prongs for plugging into an electrical outlet. The housing also contains receptacles to accept an electrical plug of an appliance.

A plurality of first electrical contacts are included within the housing and are stationary relative thereto. A second plurality of electrical contacts corresponding to the first contacts are suspended by electrical conducting strips which biasingly move the second contacts away from the first contacts. A latching assembly selectively and operatively engages the second contacts to overcome the force of the suspending strips to move the second contacts into electrical engagement with the first contacts.

More particularly, the latching assembly includes a plate slidably disposed within the housing and a bracket slidably extending through a passageway formed in the plate to selectively engage the second contacts. A solenoid attached to the bracket moves the bracket out of engagement with the second contacts upon the occurrence of a ground fault. The suspending strips then move the second contacts out of electrical engagement with the first contacts thereby breaking the electrical path. A spring may be attached to the bracket to move the bracket into engagement with the second contacts.

BRIEF DESCRIPTION OF THE DRAWINGS

FIG. 1 is a side elevational view of the ground fault circuit interrupter according to the present invention;

FIG. 2 is a front elevational view of the ground fault circuit interrupter of FIG. 1;

FIG. 3 is a sectional view of the ground fault circuit interrupter of FIG. 2, taken generally along the line 3—3 and in the direction indicated;

FIG. 4 is a partial sectional view of the ground fault circuit interrupter of FIG. 2, taken generally along the line 4—4 and in the direction indicated;

FIG. 5 is a partial view of the ground fault circuit interrupter of FIG. 3;

FIG. 6 is a partial view of FIG. 5 showing a latch mechanism forming a part of the present invention, shown in a down position;

FIG. 7 is the latch mechanism of FIG. 6, shown in an up position;

FIG. 8 is an actuating bracket forming a part of the present invention;

FIG. 9 is an alternate embodiment of the bracket of FIG. 8; and

FIG. 10 is an electrical schematic diagram of the electrical circuit forming a part of the ground fault circuit interrupter according to the present invention.

DETAILED DESCRIPTION OF THE INVENTION

Referring now to FIGS. 1 and 2, a ground fault circuit interrupter (GFCI) according to the present invention is generally indicated as 10. The GFCI 10 includes a housing 12 which encloses and environmentally protects working components of the GFCI. The housing 12 is constructed of a forward cover 14 and a rear base 16 which are attached together by bolts 17. Extending rearward out of the rear base 16 is a line input 18, a neutral input 20, and a ground input 22.

Alternatively, the GFCI may be permanently mounted instead of being portable. Accordingly, instead of connecting line 18, neutral 20, and ground 22 inputs through the use of a plug, connecting screws or attachment points can also be provided, as in well known in the art. The inputs may also be directly connected to the power source. Thus, the GFCI would simply replace the standard wall-mounted receptacle.

On the forward cover 14, and extending inward from the forward cover is a line adapter receptacle 26, a neutral adapter receptacle 28, and a ground adapter receptacle 30. Above the receptacles 26–30 and extending through the forward base 14, is a reset button 32, a light emitting diode or LED signalling light 34 enclosed by a window 35, and a test switch 38.

Referring to FIGS. 3 and 4, a resettable switch mechanism is indicated generally as 40. The switch mechanism includes a pusher plate 42 which is slidably mounted in a support structure 43 of a frame 44. The frame 44 is fixedly attached to the rear base 16, but the frame could also be molded as an integral part of the rear base 16. A sliding connection between the frame 44 and the pusher plate 42 is provided by a slot 48 formed in the support structure 43 which is slidably engaged by a ridge 50 formed on the peripheral edge of the pusher plate 42. The pusher plate 42 thereby moves in a forward and rearward or first direction. The frame 44 and housing 12 are preferably formed from a durable insulating material such as a rubberized plastic. The pusher plate 42 may be formed from a similar material, however, it is preferred that the pusher plate be of a material which slides freely within the frame 44.

The frame 44 also includes a circuit board 54 which extends along the rear of the cover 14. The pusher plate 42 extends freely upward through an aperture 52 formed in the circuit board 54. Fixably mounted to the circuit board 54 and electrically connected to the electrical components on the circuit board is a fixed line contact 56 and a fixed neutral connect 58. The circuit board 54 is in turn fixably connected to the support structure 43.

A movable line contact 62 and a movable neutral contact 64 are mounted on a carrier bar 66 which extends along an outer face of the pusher plate 42. A metal strip 68 electrically connected to the moveable line contact 62 and a metal strip 70 electrically connected to the moveable neutral contact 64 are attached to the end 66a of the carrier bar 66 to suspend the carrier bar within the housing 12. The metal strips 68, 70 are attached to the circuit board 54 by joint points 72 which provide an electrical connection between the metal strips 68, 70 and the electronic components on the circuit board 54. The metal strips 68, 70 are fabricated to be elastic and resilient and act as a leaf spring to bias the carrier bar 66 and thus, the movable contacts 62, 64 away from the fixed contacts 56, 58. To stably support the carrier bar 66, the strips 68, 70 straddle the pusher plate 42 to attach to the ends 66a of the carrier bar 66. As is described below, the electrical components on the circuit board are electrically connected to the line and neutral inputs 18 and 20 and the line and neutral receptacles 26 and 28. The electrical connections are preferably made by flexible connections but rigid connectors 73 may also be used as shown in shadow in FIG. 5.

The switching mechanism 40 also includes a latch mechanism 74 for selectively overcoming the biasing force of the metal strips 68, 70 and for establishing electrical continuity between the movable contacts 62, 64 and the fixed contacts 56, 58. The latch mechanism 74 includes a solenoid 76 having a solenoid plunger 78 which is operatively coupled to a bracket 80. The solenoid 76 is fixedly mounted within the housing 12, preferably by being attached to the frame.

Referring to FIGS. 4, 5, and 8, the bracket 80 includes a straight bracket plunger section 84, which parallels the movement path of the pusher plate 42 and forms a sliding slot or notch 86, and a pair of legs 88 on each side of the notch. The legs 88 straddle a groove 89 formed in an outer end 90 of the solenoid plunger 78 so that the bracket 80 is restrained from sliding forward and rearward relative to the outer end. The bracket plunger section 84 is connected to a carrier bar section 92, which extends outward at right angles to the bracket plunger section 84. The carrier bar section 92 extends through a passageway 98 which transversely extends through the pusher plate 42 to restrict the bracket 80 to slidable movement relative to the pusher plate. Opposite the bracket plunger section 84 and outward of the pusher plate 42, the carrier section 92 connects to an end section 94 so that the bracket 80 is generally U-shaped. Preferably, the bracket 80 is formed from a thin metal plate.

The solenoid plunger 78 is also operatively connected to a biasing member 100, preferably a spring which may be disposed within the solenoid 76. In the absence of a force generated by the solenoid 76, the spring 100 forces the solenoid plunger 78 outward toward or normal to the movement direction of the pusher plate 42. The solenoid 76 is attached to the frame 44 (FIG. 3), and the solenoid and bracket 80 are positioned and configured so that when the solenoid is activated to retract the solenoid plunger 78 to an inward position, the outer end section 94 of the bracket 80 abuttingly extends along an outer face 102 of the pusher plate 42, as shown in FIG. 5. When the solenoid plunger 78 and bracket 80 are in the inward position, the outer end section 94 clears the carrier bar 66 thereby not interfering with the forward and rearward movement of the carrier bar 66. Under the biasing influence of the metal strips 68 and 70, the carrier bar 66 moves rearward so that the moveable line contact 62 and moveable neutral contact 64 move away from and break electrical contact with the line contact 56 and the neutral contact 58, respectively.

The pusher plate 42 is attached to the reset button 32 which extends through the forward cover 14. The latch mechanism 74 also includes a biasing arrangement 104 such as springs 106 which are operatively attached to the circuit board 54 and the pusher plate 42 by having one end attached to the circuit board 54 and the other end engaging the reset button 32. The springs 106 apply a biasing force to force the reset button 32 forward where such biasing force is sufficient to overcome the biasing force applied by the metal strips 68 and 70 on the carrier bar 66.

Referring to FIGS. 1 and 2, a center line A—A of the circuit board 54 and latch mechanism 74 may be oriented in any direction relative to a center line B—B of the inputs 18–22 and the receptacles 26–30. It has been found that orienting the latch mechanism 74 so that the centerlines A—A and B—B are perpendicular and also orienting the solenoid 76 (FIG. 5) so that the path of travel of the solenoid plunger 78 is parallel to centerline A—A provides for a desirable compact configuration.

Referring to FIGS. 5 and 9, an alternate embodiment of the bracket 80 is generally designated as 108. In the bracket 108, the bracket plunger section 84 and end section 94 extend at right angles to and in opposite directions from the carrier bar section 92. The bracket 108 is thus adapted for instances where the solenoid plunger 78 is above the passageway 98 in the pusher plate 42.

Referring to FIGS. 4 and 5, in operation when the switching mechanism 40 is in the open position, the solenoid plunger 78 is in the inward position so that the bracket 80 is retracted to place the outer end section 94 adjacent the pusher plate 42. The carrier bar 66 is free to move forward and rearward or in the first direction along the outer face 102 of the pusher plate 42. Due to the biasing force exerted on the carrier bar 66 by the metal strips 68, 70, the carrier bar 66 is held in a rearward position so that there is no electrical contact between the moveable line and neutral contacts 62, 64 on the carrier bar, and the fixed contacts 56, 58.

Referring to FIGS. 5 and 6, pressing the reset button 32 rearward into the forward cover 14 (FIG. 4) moves the pusher plate 42 rearward. The rearward movement of the pusher plate 42 to a second position pushes the bracket 80 rearward to a rearward position where the carrier bar 66 is forward of or clears the bracket. When the carrier bar 66 clears the bracket, the spring 100 then forces the solenoid plunger 78 outward to slide the carrier bar section 92 through the passageway 98 and along the rearward surface of the carrier bar 66 and between the strips 68, 70, as shown in FIG. 6. When the pressing force on the reset button 32 is removed, the reset button and pusher plate 42 move forward to a first or forward position under the influence of the springs 106. During the rearward movement, the bracket 80 selectively engages the carrier bar 66 and displaces the movable contacts 62, 64 toward the fixed contacts 56, 58 to a forward position. When the plate 42 is at the forward position, electrical continuity is established between the contacts. The electrical contact is maintained until a ground fault is detected.

When a ground fault is detected as described below, the solenoid 76 is actuated to retract the solenoid plunger 78 inward to slidably move the bracket 80 through the passageway 98 and to place the outer end 94 of the bracket adjacent the pusher plate 42. The sliding movement of the bracket 80 disengages the bracket from the carrier bar 66 so that the carrier bar is free to move in a rearward direction. The biasing force applied to the carrier bar by the metal strips 68 and 70 moves the moveable contacts 62, 64 away from the contacts 56, 58 to open the electrical circuit, as shown in FIG. 5.

Referring to FIG. 10, the preferred embodiment of the electrical circuitry of the present invention is generally indicated at 114. In the electrical circuit 114, the line input 18, switch mechanism 40, and line receptacle 26 are electrically coupled to form portions of a line conductor 116. Similarly, the neutral input 20, switch mechanism 40, and neutral receptacle 28 are electrically coupled to form portions of a neutral conductor 118. A ground conductor 119 routes the ground input 22 to the ground adapter receptacle 30. In response to a detected ground fault, the switch mechanism 40 moves from a closed position (FIG. 7) to an open position (FIG. 5) and electrical flow through the line conductor 116 and the neutral conductor 118 is interrupted to protect the user.

The line conductor 116 and neutral conductor 118 between the receptacles 26, 28 and the fixed contacts 56, 58 pass through a core 120 of a detecting transformer 122 and form the primary windings 124 of the transformer, as is well known in the art. The transformer 122 detects imbalances in current flowing through the line conductor 116 and the neutral conductor 118, respectively. Any current imbalance above a predetermined level indicates a potentially harms ground fault. Upon occurrence of such a current imbalance, a voltage is created across a secondary winding 126 of the transformer 122.

The secondary winding 126 is coupled to an amplifier U1. The first end 142 of the secondary winding 126 is coupled to a first input 150 of the amplifier U1 through a capacitor C1 while a second end 144 of the secondary winding is connected to a second input 152 of the amplifier. Capacitor C2 is connected between the second input 152 and ground point 154 of the amplifier U1. Additionally, the ground point 154 is coupled to a setting input 156 of the amplifier U1 through a resistor R1 while the common point between resistor R1 and the ground point 154 is further coupled to a feedback output 158 through a capacitor C3.

A power input (line) point 160 of the amplifier U1 and an anode 170 of an SCR 172 are coupled to the power conductor 116 (line) through a resistor R2, a solenoid winding 214, and a non-linear resistor R4 while the gate 174 of the SCR is connected to an output 176 of the amplifier. A capacitor C4 is additionally coupled between the output 176 oft he amplifier U1 and a cathode 178 of the SCR 172. A power input (neutral) 180 is connected to the common junction between the capacitor C4 and the cathode 178 of the SCR 172 and is finally coupled to a suitable point of the power conductor 118 (neutral). Line conductor 116 and neutral conductors 118 are coupled through a MOV component (Modulator of Voltage) 204 to further suppress transient voltages appearing on the lines.

The LED 34, which is visible through the window 35 (FIG. 2) mounted in the base 16, is powered through a resistor R3 and a diode D1, from a point 212 of a winding 212 of the solenoid 214 and the power input (neutral) 180 of the amplifier U1, the other end 216 of the winding 214 is connected to the common junction of the resistor R2 and the SCR 172. The neutral conductor 118 is coupled to the line conductor 116 through component 204 which protects the appliances by suppressing transients appearing on the line 116 and neutral 118 conductors.

In operation, the LED 34 is normally illuminated by the flow of current through the line 116 and the neutral 118 conductor. This indicates that the circuit is functioning properly with the switch mechanism 40 in the closed position and the flow of current balanced through the line 116 and the neutral 118 conductor.

When a ground fault occurs, a signal sent to the amplifier U1 by the secondary windings 126 of the detecting transformer 122 activates the amplifier output 176. This activates the SCR 172 causing current to flow through the windings 214 of the solenoid 76 forcing the solenoid plunger 78 to retract. Movement of the solenoid plunger 78 retracts the bracket 80 inward. Movement of the bracket 80 disengages the bracket from the carrier bar 66 allowing the carrier bar to move rearward to break the contact between the movable contacts 62, 64 and fixed contacts 56, 58. The breaking of the contacts interrupts current flow through the line conductor 116 and the neutral conductor 118 extinguishing the LED 34 and alerting the user.

Note, that the solenoid 76 is not activated or supplied with current while the circuit functions normally, that is, while there is no ground fault detected. This reduces the amount of heat generated and extends component lifetime. The solenoid 76 is preferably only powered when a ground fault is detected.

The test switch 38 and a resistor R5 are connected in series between the neutral input 20 and the line adapter receptacle 26 to form a test loop 132 for testing the switch mechanism 40. When the user depresses the test switch 38, a short circuit is created between the line conductor 116 and the neutral conductor 118 causing a simulated ground fault. This causes the circuit 114 to activate the solenoid 76 and interrupt the flow of current through the line conductor 116 and the neutral conductor 118 thus, causing the LED 34 to be extinguished. The user should then clear the ground fault before again depressing the mechanical reset button 32 to place the switch mechanism 40 in the closed position.

Table 1 provides examples of typical component values and part numbers suitable for the embodiment of the circuit shown in FIG. 10.

TABLE 1

COMPONENTS

| DESIGNATION | TYPE | VALUE |
| --- | --- | --- |
| R1 | ⅛ W | 240 KΩ |
| R2 | ⅛ W | 50 KΩ |
| R3 | ¼ W | 5 KΩ |
| R4 | 3 W — non linear | 10 KΩ |
| R5 | ⅛ W | 15 KΩ |
| C1 | 50 V | 10 μF |
| C2 | 200 V | 0.1 μF |
| C3 | 200 V | 0.02 μF |
| C4 | 200 V | 0.01 μF |
| D1 | | 100 MA, 500 V |
| U1 | RV4140 (Raytheon) | |
| SCR (172) | TAG 91-P001 | |
| SOLENOID (214) | | 10 × 1.5 mm, 0.07 mm SWG #45 enamel wire/1.150 turns |
| TRANFORMER (124) | | 1.2 × 2 mm core, SWG #49 enamel wire/760 turns |
| 204 | MOV | 150 V |
| 34 | LED | |

Thus, a GFCI 10 has been described which quickly detects a ground fault and interrupts the flow of current. The GFCI 10 utilizes a minimum of moving parts and is durably constructed.

A specific embodiment of the portable ground fault circuit interrupter according to the present invention has been described for the purposes of illustrating the manner in which the invention may be made and used. It should be understood that implementation of other variations and modifications of the invention in its various aspects will be apparent to those skilled the art, and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A resettable latch mechanism comprising:

plug means for establishing an electrical connection with a first neutral conductor and a first line conductor;

receptacle means for establishing an electrical connection with a second neutral conductor and a second line conductor;

a housing attached to said plug and to said receptacle means;

a plurality of first electrical contacts disposed within the housing and configured to be stationary relative to the housing, said first contacts being electrically connected to one of said plug means and said receptacle means;

a plurality of second electrical contacts corresponding to the first electrical contacts, the second electrical contacts disposed within the housing;

means for connecting the second electrical contacts to the other of said receptacle means and said plug means, said means for connecting configured to movably support said second electrical contacts within the housing, and for biasing the second contacts away from the first contacts; and a latching assembly including a plate slidably disposed within the housing and bracket means slidably extending through a passageway formed in said plate, said bracket means configured to abuttingly engage the second contacts to permit the second contacts to engage the first contacts to establish electrical contact between the first contacts and the second contacts;

solenoid means operably attached to the bracket means for selectively disengaging the bracket means from abutting engagement with second contacts upon the occurrence of a ground fault; and biasing means operably attached to the bracket means for selectively moving the bracket means into engagement with the second contacts.

2. The interrupter of claim 1 further including a visual indicator selectively connected between said line conductor and said neutral conductor to indicate the electrical connection between said fixed contacts and said movable contacts.

3. The interrupter of claim 1 wherein a plunger of the solenoid means forms a groove such that a section of said bracket slidably engages said groove.

4. The interrupter of claim 1 wherein said biasing means engages said plunger means.

5. The interrupter of claim 1 wherein said movable contacts are mounted on a carrier bar engaged to said suspending means.

6. The interrupter of claim 5 wherein the bracket means selectively engages said carrier bar.

7. The interrupter of claim 1 including a testing means electrically connected to said plug and receptacle means for providing a simulated ground fault to test the operation of said interrupter.

8. The interrupter of claim 1 further including a reset button extending through said housing and operably attached to said plate, and spring means operably contacting said button to resist depression of said button.

9. The interrupter of claim 1 including an electrical circuit for suppressing transients on at least one of said line conductor and said neutral conductor.

10. The interrupter of claim 9 including a non-linear resistor for suppressing said transients.

11. A ground fault circuit interrupter comprising:

a plug for establishing an electrical connection with a first neutral conductor and a first line conductor;

a housing;

a plurality of first electrical contacts disposed within the housing and configured to be stationary relative to the housing;

a plurality of second electrical contacts corresponding to the first electrical contacts, the second electrical contacts disposed within the housing;

support means electrically connected to the second contacts for movably supporting the second electrical contacts within the housing;

the supporting means including means for biasing the second contacts away from the first contacts; and a latching assembly further including a plate slidably disposed within the housing and movable in a first direction between a first position and a second position;

bracket means slidably extending through a passageway formed in said plate, said bracket means configured to abuttingly engage the second contacts to permit the second contacts to move in said first direction toward the first contacts to establish electrical contact between the first contacts and the second contacts when the plate moves from the second position to the first position;

solenoid means for selectively disengaging the bracket means from the second contacts upon the occurrence of a ground fault; and biasing means operably attached to the bracket means to selectively move the bracket means into engagement with the second contacts when said plate is in said second position.

12. The interrupter of claim 11 further including a visual indicator electrically connected to said line conductor and said neutral conductor to indicate when electrical connection between said fixed contacts and said movable contacts is established.

13. The interrupter of claim 11 including a reset button extending through said housing and operably attached to said plate to force said plate from said first position to said second position and spring means operably attached to said reset button for applying a force on said reset button to force said reset button and said plate from said second position to said first position.

14. The interrupter of claim 11 wherein said bracket includes a first section extending in said first direction, said first section forming a notch, a plunger of the solenoid means forms a groove slidably engaging said notch.

15. The interrupter of claim 14 wherein said bracket forms a second section connected to said first section and extending through the passageway in said plate, and a third section connected to said second section extending in said first direction.

16. The interrupter of claim 15 wherein said first section and said third section extend in generally the same direction relative to said second section.

17. The interrupter of claim 15 wherein said first section and said third section extend in generally opposite directions relative to said second section.

18. A ground fault circuit interrupter comprising:

a plug for establishing an electrical connection with a first neutral conductor and a first line conductor;

a housing;

a plurality of first electrical contacts disposed within the housing configured to be stationary relative to the housing;

a plurality of second electrical contacts corresponding to the first electrical contacts, the second electrical contacts disposed within the housing;

flexible supporting members connected to the second contacts for movably supporting the second electrical contacts within the housing, the supporting members electrically coupled to the second contacts;

the supporting members including biasing element configured to urge the second contacts away from the first contacts; and a latching assembly further including a plate slidably disposed within the housing;

a bracket member slidably extending through a passageway formed in the plate;

the bracket member configured to abuttingly engage the second contacts to permit the second contacts to engage the first contacts to establish electrical contact between the first contacts and the second contacts;

a solenoid mechanism operably attached to the bracket member configured to selectively disengage the bracket member from abutting engagement with the second contacts upon the occurrence of a ground fault; and a biasing element operably attached to the bracket member for selectively moving the bracket member into engagement with the second contacts.

* * * * *